United States Patent
Barde

(10) Patent No.: US 9,213,567 B2
(45) Date of Patent: Dec. 15, 2015

(54) SYSTEM AND METHOD FOR CONTROLLING THE INPUT/OUTPUT OF A VIRTUALIZED NETWORK

(75) Inventor: Kaushik C. Barde, Sunnyvale, CA (US)

(73) Assignee: Futurewei Technologies, Inc., Plano, TX (US)

( * ) Notice: Subject to any disclaimer, the term of this patent is extended or adjusted under 35 U.S.C. 154(b) by 678 days.

(21) Appl. No.: 13/247,578

(22) Filed: Sep. 28, 2011

(65) Prior Publication Data

US 2012/0084487 A1 Apr. 5, 2012

Related U.S. Application Data

(60) Provisional application No. 61/389,071, filed on Oct. 1, 2010.

(51) Int. Cl.
G06F 9/455 (2006.01)

(52) U.S. Cl.
CPC ........ *G06F 9/45541* (2013.01); *G06F 9/45558* (2013.01); *G06F 2009/45579* (2013.01)

(58) Field of Classification Search
CPC ............ G06F 9/45541; G06F 9/45558; G06F 2009/45579
USPC ....................................... 711/6, 203; 718/108
See application file for complete search history.

(56) References Cited

U.S. PATENT DOCUMENTS

| | | | |
|---|---|---|---|
| 6,496,847 B1 * | 12/2002 | Bugnion et al. | ................... 718/1 |
| 2007/0028244 A1 | 2/2007 | Landis et al. | |
| 2007/0162619 A1 * | 7/2007 | Aloni et al. | ................... 709/250 |
| 2008/0183944 A1 | 7/2008 | Thornton et al. | |
| 2008/0298274 A1 | 12/2008 | Takashige et al. | |
| 2010/0057908 A1 | 3/2010 | Smith et al. | |
| 2010/0175064 A1 | 7/2010 | Brahmaroutu | |

FOREIGN PATENT DOCUMENTS

CN 1455566 A 11/2003

OTHER PUBLICATIONS

International Search Report and Written Opinion of the International Searching Authority, PCT/US2011/053731, date of mailing Feb. 14, 2012, 8 pages.
"Intel® 82599 10 GbE Controller," Datasheet, Apr. 2011, pp. 1-200, 322429-008 Revision No. 2.7.
"Intel® 82599 10 GbE Controller," Datasheet, Apr. 2011, pp. 201-400, 322429-008 Revision No. 2.7.
"Intel® 82599 10 GbE Controller," Datasheet, Apr. 2011, pp. 401-600, 322429-008 Revision No. 2.7.
"Intel® 82599 10 GbE Controller," Datasheet, Apr. 2011, pp. 601-848, 322429-008 Revision No. 2.7.

(Continued)

*Primary Examiner* — Gary W Cygiel
(74) *Attorney, Agent, or Firm* — Slater & Matsil, L.L.P.

(57) ABSTRACT

In accordance with an embodiment a method of running a virtual machine on a server includes controlling data path resources allocated to the virtual machine using a first supervisory process running on the server, controlling data path resources comprising controlling a data path of a hardware interface device coupled to the server, and controlling control path and initialization resources of the hardware interface device using a second process running on the server, where the second process is separate from the first supervisory process.

17 Claims, 4 Drawing Sheets

(56) References Cited

OTHER PUBLICATIONS

Casado, M., et al., "Virtualizing the Network Forwarding Plane," Nov. 30, 2010, 6 pages, ACM, Philadelphia, Pa.

"Cisco VN-Link: Virtualization-Aware Networking," A Technical Primer, 2009, pp. 1-8, Cisco White Paper.

"Intel® 82576 Gigabit Ethernet Controller, High-performance, Dual-Port Gigabit Network Connectivity for multi-core and virtualized platforms," Product Brief, Network Connectivity, 4 pages.

Santos, J. R., et al., "Bridging the Gap between Software and Hardware Techniques for I/O Virtualizatior," USENIX Annual Technical Conference, 2008, pp. 29-42.

"OpenFlow Switch Specification," Feb. 28, 2011, pp. 1-56, Version 1.1.0 Implemented (Wire Protocol 0x02).

Chinese Office Action received in Application No. 201180045902.1 mailed May 18, 2015, 10 pages.

Chinese Search Report received in Application No. 201180045902.1 mailed May 4, 2015, 3 pages.

\* cited by examiner

SYSTEM AND METHOD FOR CONTROLLING THE INPUT/OUTPUT OF A VIRTUALIZED NETWORK

This application claims priority to U.S. Provisional Application No. 61/389,071, filed on Oct. 1, 2010, entitled "Accelerated NetPath: A Novel Approach for Improving Virtualized Network Input/Output Performance Using Network Interface Card Assisted Multi-Queuing," which application is hereby incorporated herein by reference in its entirety.

TECHNICAL FIELD

The present invention relates to computer servers, and, in particular embodiments, to a system and method for controlling the input/output (IO) of a virtualized network.

BACKGROUND

Virtualization technology's emergence as a core Infrastructure as a Service (IaaS) backbone for variety of cloud deployments is known. Over the period of about the last 10 years, advances in x86 hardware assists have paved the way for performance and scalability focused virtualization solutions. Hypervisors, otherwise known as virtual machine monitors (VMMs) employ software instruction intercept mechanisms to emulate a central processing unit (CPU), memory and IO resources for an operating system (OS) to run as a guest. A properly written VMM may provide reliable, secure and accurate systemic view to the guest OS.

VMMs may use para-virtualization for guaranteeing coherent CPU, memory and IO response. For CPU virtualization, prior to virtualization technology (VT) extension implementations, VMMs such as VMWare/Xen used emulated basic input/output system (BIOS), CPU schedulers, and elaborate ring and instruction emulation to "trap and execute" virtual instructions on real CPU cores. However, modern day CPUs may take care of guest vs. root partitioning and offload CPU virtualization responsibility from VMMs. This is usually achieved by providing CPU instructions to "batch" executed set of instructions from the guest on physical CPU. Dominant x86 architectures, such as those produced by Intel® and AMD® provide secure virtual machine (SVM)/Virtual Machine Extension (VMX) instructions for VMENTER/VMEXIT operations. Furthermore, CPUs are adding improvements, such as Tagged-Translation Lookaside buffers (TLB), Pause-Loop Exiting (PLE), and Virtual Processor Identifiers (VPID) to reduce the number of CPU cycles required for guest CPU sharing. Memory optimization may be further focused on reducing guest page iterations via page table shadowing, optimizing guest address translations and overheads caused by VMEXIT.

IO virtualization remains an important area for improving virtualized IO performance and scalability, and network IO is one of the core areas within network virtualization where substantial focus has been applied. Hardware based virtualization techniques, such as multi-queues, Intel based Virtualization Technology for Direct Device Connect (VT-d), Single Root IO Virtualization (SR-IOV) and their software-based virtualization end points, such as Xen isolated driver domain (IDD) and NetChannel2, have been applied to improve overall Network Interface Card (NIC) performance per guest, however, there still remains room for improvement in areas such as CPU loading, infrastructure cost, and data security.

SUMMARY OF THE INVENTION

In accordance with an embodiment a method of running a virtual machine on a server includes controlling data path resources allocated to the virtual machine using a first supervisory process running on the server, controlling data path resources comprising controlling a data path of a hardware interface device coupled to the server, and controlling control path and initialization resources of the hardware interface device using a second process running on the server, where the second process is separate from the first supervisory process.

In accordance with another embodiment, a method of operating a server system for running a plurality of virtual machines includes loading a control plane process, loading a supervisory process instantiating a virtual machine controlling data path resources between the virtual machine and a hardware interface device via the supervisory process, and controlling control path and initialization resources of the hardware interface device via the control plane process.

In accordance with a further embodiment, a data processing system for a virtual machine includes a processor, a memory coupled to the processor, and an interface port configured to be coupled to a hardware network interface device separate from the processor. The processor is configured to run a first process that transfers data between a packet queue associated with the virtual machine and a packet queue within the hardware network interface via the interface port. The process is further configured to run a second process that controls a configuration of the hardware network interface device, the second process being separate from the first process.

In accordance with a further embodiment, a non-transitory computer readable medium has an executable program stored therein. The program instructs a processor to perform the steps of loading a control plane process, loading a supervisory process, instantiating a virtual machine, controlling data path resources between the virtual machine and a hardware interface device via the supervisory process, and controlling control path and initialization resources of the hardware interface device via the control plane process.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
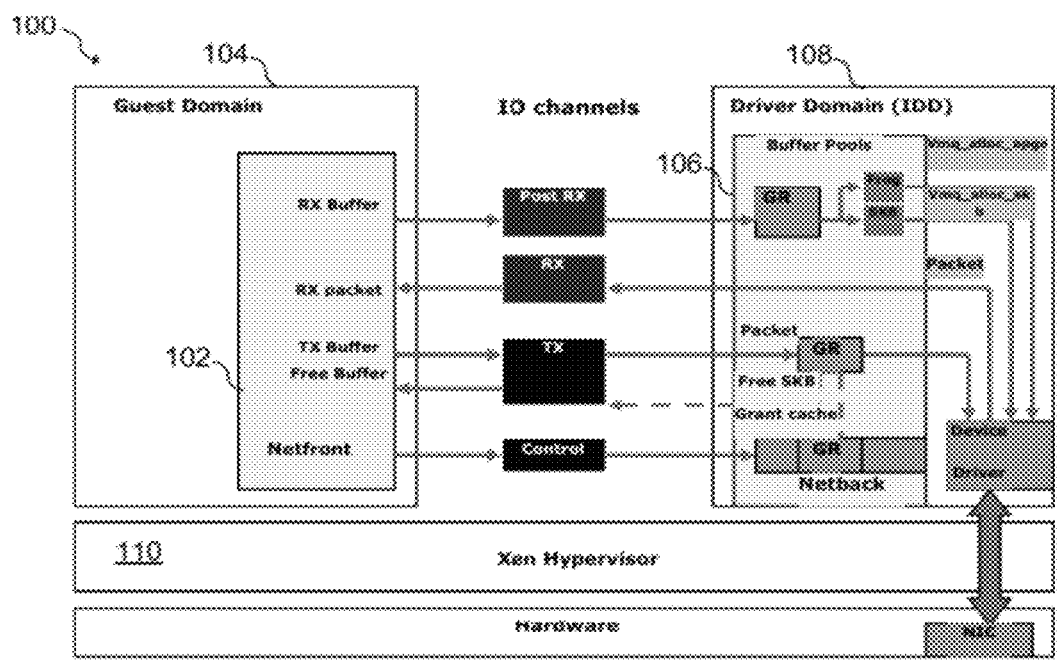
FIG. 1 illustrates a prior art Xen Netchannel-2 architecture.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Some embodiment approaches are alternative approaches to existing para-virtualization schemes and include unique building blocks that leverage NIC hardware-based multi-queue capability while reducing CPU context switches. Embodiment systems and methods provide alternative IO virtualization scheme using various hypervisor environments that may include, but are not limited to the Xen hypervisor environment.

Some embodiment systems and methods (1) remove extra context switches for packet transmission (TX)/reception (RX) operations, (2) leverage multi-queue NICs, (3) are applicable for PV or hardware-assisted virtualization (HVM) domain setups, (4) and leverage VT-d like direct device connect capability to create scalable, low-latency and better power managed network IO channels. In some embodiments, the multi-queue NIC may be implemented using, for example, Intel® VMD-q. Alternatively, other NIC devices may be used.

Some embodiment systems include a Split Network Device & IO view for a slow control path and a fast data path on an x86 system. This can be made applicable to other devices, such as storage devices. Embodiment systems and methods also include ways of exposing 10 device register handling and NIC queue mapping from a Hypervisor context, and/or a reduction in CPU context switches in comparison to existing Para-Virtualization approaches. Further systems may also have increased virtual machine (VM) IO latency and VM page cache locality per CPU core/thread.

Some embodiment systems may be implemented by modifying and extending a Xen architecture. Such a solution may also be CPU VT extension compliant. In one embodiment example, a Xen 4.0, 2.6.32 kernel is used as domain 0 (Dom0) operating in 64-bit and 32/64 bit Linux guest environment. Alternatively, other environments may be used.

Machine environments like Xen use an emulated device model (QEMU) or Para-Virtualization for emulating network IO. A source of performance degradation is the cost of virtualizing IO devices per VMs. In the recent years, the evolution of hardware assists for virtualization has improved overall CPU and memory behavior for the virtualized guests that are capable of achieving near native performance. A network device and its operation are a couple of core performance sensitive indicators. Any business system from servers to desktops and laptops, and applications that run on them, rely on near "lossless" performance when it comes to TX/RX data. Under virtualization, network IO performance may become more critical. Therefore, an embodiment approach is focused on improving network IO. While some embodiments described herein use Xen as a sample hypervisor system to illustrate embodiment systems, other embodiment systems and methods are hypervisor agnostic and generic enough to work on other x86 hypervisors including, but not limited to kernel virtual machine (KVM).

In an embodiment, QEMU device model and para-virtualization both employ techniques for software IO virtualization. QEMU one of the original open source software IO emulators that have PIIX3/PIIX4—a pre-ICH south bridge that emulates BIOS, ACPI, IDE controllers (floppy, CD-ROM, Hard disk), frame buffer device, and network controllers (RealTek, e1000) as primary controllers. Further, many more custom extensions have been added in recent times. Such an embodiment setup allows IO channel operations TX/RX (through memory mapped IO (MMIO), and direct memory access (DMA)) from a guest to operate in "trap and forward" mode per real devices in a privileged guest through gpfn to mfn translations, interrupt handling, and complex page table walks. All of this results an emulated device having a "real" device mapping. Main issues with a QEMU based emulated device model includes performance, scalability, and power management. These measures are directly correlated to the cost of "context switching" between kernel/user modes of various hypervisor-based systems software layers.

Overall context switching between a guest and a host user mode, a kernel mode to a hypervisor and back may cause an exponential instruction load on a CPU, which may possibly result in delayed performance, reduced scalability, reduced instruction execution latency and increased power load. One original PV approach was designed to "cut" QEMU based emulation for handling IO channel operations (DMA/MMIO) and directly post TX/RX buffers inside a physical device via real device driver. A modified guest/dom0/Xen setup that includes custom back/front drivers, paginated memory changes (grant table) and has guest TX/RX buffers mapped to a real device TX/RX. The cost of context switching in the original PV approach is high because TX/RX activity may go through at least 4 context switches, for example, from guest to user/kernel to Dom0 to hypervisor, thereby causing a high cycle per packet count and a high TLB overhead. One alternative approach is suggested in "Bridging Gap between Software and Hardware Techniques for I/O Virtualization," by Jose Renato Santos, Yoshio Turner, G. (John) Janakiraman, and Ian Pratt, HP Laboratories, technical report HPL-2008-39, which is incorporated by reference herein. This approach uses IDD instead of Dom0 as a device IO channel host to improve guest IO channel performance. One issue with this solution is that there is no change to the number of "intercept" elements with respect to the context switch. Furthermore, as more VMs cause latency, the throughput may drop significantly. This approach may also suffer from VM TX/RX queue over and unfair queue subscription. Most NICs have a single TX and RX queue that suffers from queue-over consumption from one VM. For example, a VM with highly "chatty" application may cause that VM to occupy real device queue with TX/RX buffers and "starve" other VMs from IO channel operations.

Hardware is quickly evolving to support hardware based virtualization assists for hypervisors. NIC hardware vendors have created SR-My based and multiple queue capability based cards to "offload" software-based TX/RX ring buffers. SR-My based cards use a modified PCI configuration and a PF/VF based master and slave device driver model to directly map NIC IO channels as separate "physical device" to the VMs removing major hypervisor dependencies.

FIG. 1 illustrates the multi-queue device support of Xen Netchannel-2 100 with IDD, which is an existing IO channel architecture and flow. The Xen PV infrastructure includes backend/frontend drivers, memory page sharing, and hypervisor supported data structures such as an event channel for interrupt notifications and callbacks, hypercalls and granttable for inter-domain communication. The network IO channel view of the guest is dependent on guest type i.e., whether or not the guest is operating in PV or HVM mode. The traditional HVM mode implies that a guest OS is running without any modification to its kernel or user mode components or its life cycle.

Xen Hypervisor 110 is a small hypervisor that handles memory management, VCPU scheduling, and interrupt dispatching. Dom0 through PV setup, including grant tables, an event channel, and shared memory, supports all IOs for control and on behalf of guests. The Dom0 through the QEMU device model gets a virtualized IO setup or para-virtualized setup via a Netfront/Netback driver mechanism. Furthermore, the DomU guest, which is either fully virtualized or para-virtualized, receives all of its IO service from Dom0. Difficulties with this approach include slower system operation due to the fully virtualized IO being very expensive in terms of CPU cycles. While para-virtualized IO has a good throughput with a small number of guests, this throughput decreases rapidly as the number of guests increases. In both cases, IO latency does not scale with the incremental guest count. This presents difficulties with respect to IaaS cloud VM IO scalability.

Regarding current IO latency, PV uses shared memory to move TX/RX data between the guest and Dom0 using a memory "grant" mechanism involving explicit copies from and to operations. The event channel between the guest and Dom0 is used to activate TX/RX activity triggers. Whether the event is actually an interrupt to Dom0 or to the guest depends on the direction of the data. Furthermore, interrupt delivery needs a context switch to the hypervisor then another context switch to the destined Dom. Therefore, the PV approach adds-in context switches that increase latency, thereby sacrificing VM scalability.

With respect to PV guest network IO flow, in a PV scenario, guest Virtual Physical Address (VPA) space is modified to map Xen memory (Xen-u). Normally, Xen memory includes about 12M of mapped memory along with a front-end driver that directly interacts with the Xen-VPA, which contains IO channel handlers. Dom0 hosts a backend driver, a native NIC driver and an IO event channel, which is a Dom0 shared memory data structure used to drive guest TX/RX buffer/packet flow. Device setup is normally done at the OS boot. The OS probes for underlying hardware including a NIC card, and sets its virtual PCI configuration space parameters and interrupt routing. Conventional network IO includes network buffers represented as TX/RX buffers. The same concept is used for virtual networks, however, virtual network 10 on virtual compute nodes tend to bear a high CPU cost due to a higher emphasis on guest network IO performance. Older PV approaches suffer from disadvantages such as sub-optimal network bridge implementations and high CPU saturation. CPU saturation also means that fewer cycles are available for VM applications, which makes this approach less practical for Cloud Compute IaaS. Netchannel2 is also geared to leverage multi-queue NICs and/or SR-IOV capable NICs.

In an embodiment of the present invention, multiple HW queues are supported with reduced context switches in a modified PV architecture that improves IO scalability and maintains the latency promise of VMDQ. This is achieved by using a dual view of a NIC device. In an embodiment, a NIC driver in Dom0 is used to perform control operations including controlling PCI configuration space and interrupt routing, which is primarily MMIO activity. Fast path queue memory mappings are handled within a hypervisor driver. Both drivers see the device register set, the control structures etc. In an embodiment, RX/TX DMA transfer has up to three context switches, for example, Xen, kernel0 & user copy.

Figure 2:
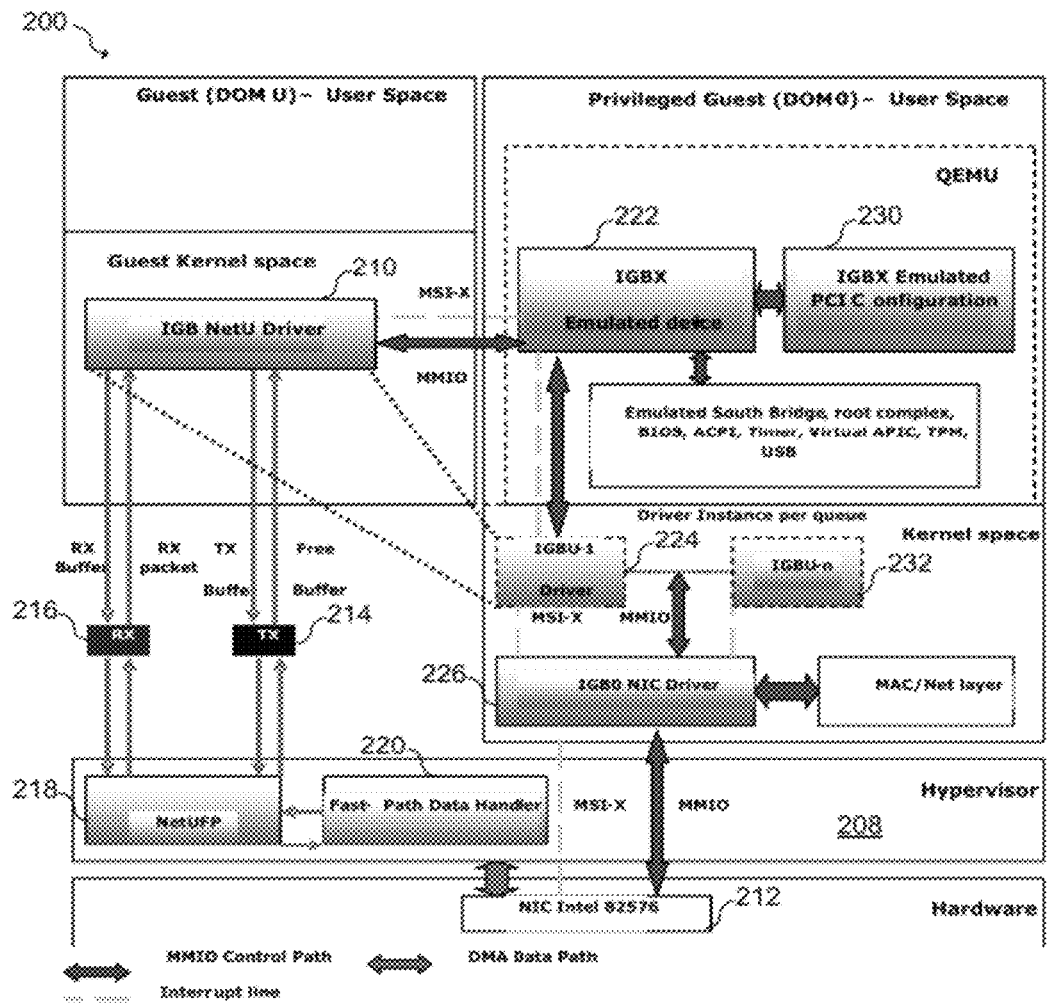
FIG. 2 illustrates an embodiment multi-queue system architecture.

FIG. 2 illustrates multi-queue (VMQ) system 200 according to an embodiment of the present invention. It should be appreciated that while a VMQ system is described for the sake of illustration, embodiment concepts may also be applied to alternative systems. VMQ system 200 uses a modified Netchannel-2 structure with multi-queue TX/RX packet flow with contributing components. In an embodiment, IGB netU driver 210, IGBX emulated device 222, IGBX emulated PCI C configuration 230 IGBU-1 driver, IGBU-n driver 232, IGB0 NIC driver 226, netUFP block 218, and fast-path data handler 220 are added and/or modified with respect to existing Netchannel-2 structures.

In an embodiment, MMIO control flow occurs from IGB NetU driver 210 in the guest kernel space of guest DomU though IGBX emulated device 222 in privileged guest Dom0. Control flow then proceeds through IGBU-1 224 driver and the IGB0 NIC driver in the Dom0 kernel space, and finally to NIC card 212 in hardware. Data flow, on the other hand, occurs between IGB NetU driver 210 in the guest Dom0 kernel space, though RX and TX buffers 216 and 214 and to NetUFP block 218 in hypervisor 208. Data flow continues from NetUFP block 218 to fast-path data handler 220, also in hypervisor 208, and onto NIC 212.

This embodiment approach may counter high CPU costs incurred due to guest grant copies done in the netback driver by removing Dom0 as a copy-bottleneck. For example, a typical Netchannel2 typical packet RX path for VM has following steps: usercopy, data copied from guest kernel to user buffer, guest kernel code, Xen code executed in the guest context, grant copy, kernel code in Dom0, and Xen code executed in Dom0 kernel context. All of these steps involve seven context switches in the PV code. Netchannel2 optimizes the grant copy stage by moving this function to the guest, which improves RX performance by placing a packet in guest CPU cache context, thereby offloading the Dom0 CPU cache. This eliminates Dom0 copy stage. Netchannel2 also provides for a mapping of an RX descriptor mapping directly into guest memory through grant caching. Turning back to FIG. 1, Netfront driver 102 in guest domain 104 assigns grants to IO buffers for its usage by multi-queue device drivers through IO channels. Driver domain 108 hosts Netback 106 and grant mechanisms. It is responsible managing direct pinning and security of page descriptors involved in TX/RX activity.

Netchannel2 with direct queue mapping per guest RX path has a user mode guest copy with packet copying to local guest memory, which is mapped to a RX queue memory descriptor reducing buffer copy time, grant copy in guest kernel mode, kernel mode in Dom0, and Xen code. With improvements in grant copy, RX performance is certainly improved. For example, physical CPU consumption decreased from 50% to 21%. However, the number of context switches is only reduced by one, which is Dom0 user mode grant copy step from original PV approach. The TX path has similar number of context switches. The cost of context switching affects overall system throughput and ultimately affects system scalability. Furthermore, the number of context switches between guest/dom0/Xen also generates thousands of CPU cycles, which affects overall power consumption. Embodiment approaches, therefore, leverage multi-queue similar to Netchannel2 but reduces the number of context switches from six to three, therefore eliminating grant copy, Dom0 user, and kernel context switches. One embodiment approach relies on MSI and assigns MSI to per guest queue IRQ for skb in/out buffer availability.

In an embodiment, the architecture is split into two parts, the TX/RX data path, which is called the fast-path, and the device initialization/control path, which is called the slow-path. Both paths are presented to the guest as emulated devices as two separate functions of the same PCI device. The slow-path device is a normal emulated device with all functionality handled by QEMU. The fast-path device is a PCI function for which the PCI configuration space is still emulated by QEMU, but the register set emulation is handled by the hypervisor. Fast-path also uses queues to setup DMA operations. These queues are directly mapped into the guest address space, but the content is modified on the flight by the hypervisor while emulating the fast-path register set. In an embodiment, there is MSI-X support as each of MSI-X vectors is further exposed to the guest as RX buffer availability. The hypervisor forwards the data stream interrupts directly to the guest.

In an embodiment, queue related infrastructure is implemented by the hardware as per guest infrastructure. The interrupt may also be a per guest resource, therefore message signaled interrupts (MSI-X) may be used. In one embodiment, one interrupt vector per queue and an extra one for control are used. Alternatively, one interrupt vector per guest is may be used. In an embodiment, the MSI-X vector is translated into an INT-X interrupt by the Hypervisor before sending it to the guest. In an embodiment, Dom0 has a full view of the NIC, PCI configuration space, register set, and MSI-X interrupt capability. NIC queues may be directly mapped during device setup.

In an embodiment, an IGB0 NIC driver is used as a side driver, which handles all initialization, control and error handling. If Dom0 also uses the NIC to send and receive network data, then the queues are also under full control of Dom0 driver. The driver self restricts to only its own per domain resources (queue registers, interrupt bits, etc.), and does not touch any guest resources.

In an embodiment, IGBU is used as a DomU side driver, which initializes its own part of the controller. It handles its own TX/RX queues and related registers and self-restricts to only its own per domain resources without touching any other guests resources. In an embodiment, this self-restriction of the guest can be enforced in the Hypervisor if the security aspect is raised with performance impact.

In an embodiment, the QEMU presents a new emulated device to guest, and handles all accesses to the device configuration space. The QEMU hyper-calls to connect the MSI-X interrupt vector to an appropriate INT-X aware by the guest. Another hypercall is performed to let the Hypervisor know about the range of MMIOs it has to emulate for the guest's network device. An important parameter is the guest pool number, which is the index to any hardware resources belong to the guest. In an embodiment, the QEMU makes this number visible to the guest through a PCI configuration register.

Regarding the hypervisor, at domain initialization time, an instance of the fast-path device control is created, which controls the NIC hardware resources that belong to a given guest. Once QEMU calls the appropriate hypercall to setup the MMIO emulation range, the hypervisor intercepts and emulates all MMIOs done by the guest through its network driver. One embodiment aspect of the emulation is the translation of the guest buffer addresses. The Hypervisor does this by saving the guest queue address on queue address register write, and then later reviews and translates all addresses written into the queues on queue tail register write.

Figure 3A:
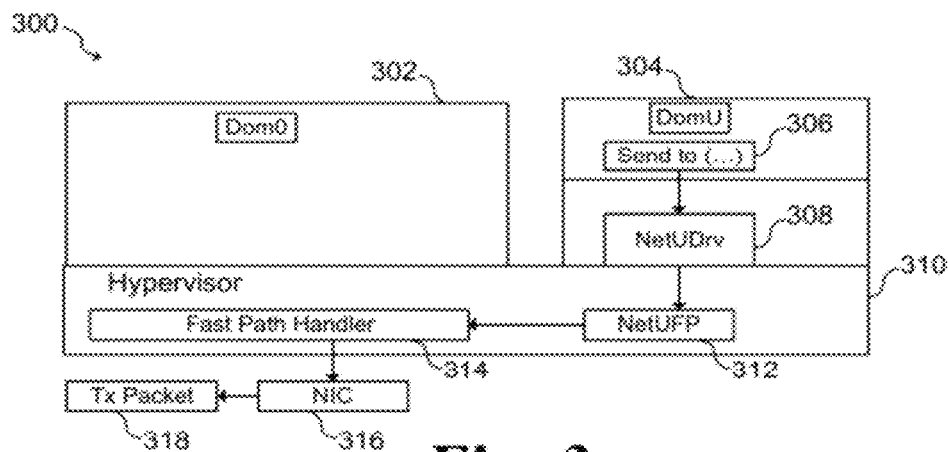
FIGS. 3a-3c illustrate block diagrams of embodiment transmit, receive and control paths.

FIG. 3a illustrates a high-level block diagram of embodiment DMA transmit data path 300. In an embodiment, transmit flow starts from guest application level. An application calls, for instance, system call sendto( . . . ) 306 within DomU 304 to send a data packet. System call sendto( . . . ) 306 context switches down to guest network driver NetUDrv 308, which drives an emulated device, thus every MMIO done on the device register set will trap into hypervisor 310. Hypervisor 310 uses device dependent module NetUFP 312 to emulate the MMIOs and to drive the hardware accordingly using fast-path handler module 314.

Page translation is done on the flight while emulating MMIOs, since the guest driver has no awareness of the machine frame number, and can only access the guest physical frame Number. The DMA engine of NIC 316 is then set to start sending out data onto the line. When the data packet 318 is sent out, NIC 316 sends back an interrupt. Hypervisor 310 forwards the interrupt to the guest kernel. The guest kernel calls the appropriate handler to cleanup.

Figure 3B:
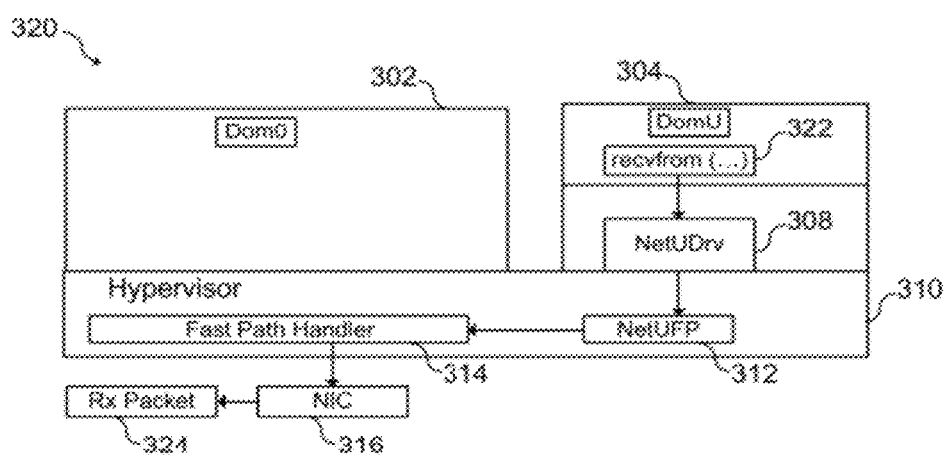

FIG. 3b illustrates a high-level block diagram of embodiment DMA receive data path 320. In an embodiment, receive flow starts with data packet 324 coming from the network. NIC 316 sends an interrupt to Hypervisor 310 when the packet is fully DMA'ed into the system memory. Hypervisor 310 then forwards the interrupt to the guest kernel. The interrupt handler in guest NetUDrv 308 using MMIOs to check for number of buffers filled, then forwards those buffers to upper network stack.

New buffers are then allocated and set up into the RX queue. The setup process finishes with a MMIO to the queue tail register. This MMIO is trapped by Hypervisor 310. Hypervisor emulation of this particular register in NetUFP 312 also handles the translation of all buffer addresses written into the RX queue.

Figure 3C:
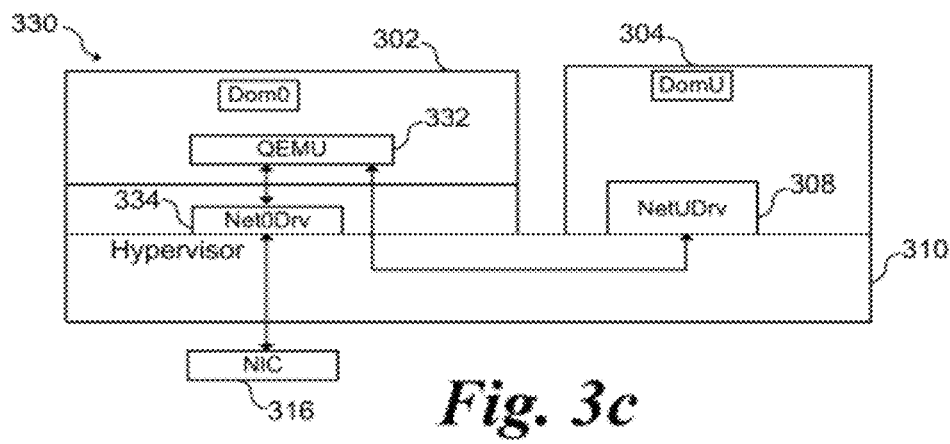

FIG. 3c illustrates a high-level block diagram of embodiment MMIO control path 330, which is implemented as a fully emulated device. In an embodiment, this emulation is performed by the QEMU 332 in Dom0 302. QEMU 332 goes through Dom0 NIC driver Net0Drv 334 to control and to receive control events to/from NIC 316. The emulated device is sent to the guest as a second PCI function of the same emulated network device used by the data path. In an embodiment, a separate interrupt vector is assigned to this PCI function, and QEMU 332 uses this interrupt vector to send control events to the guest driver, which handles these in the NetUDrv 308. MMIOs done by NetUDrv 308 from the guest are forwarded back to QEMU 332 in Dom0 302. Since control operations are infrequently performed compared to the data path, latencies of these have little or no impact on data throughput or data latency.

In an embodiment, a server is implemented using 25 GB of memory, a multi-queue (VMD-q) capable Intel® 82576 1GBE controller on a Intel® Xeon 5500 based quad core CPU using 2.6.32 kernel as Dom0 operating in 64-bit and 32/64 bit Linux guest environment. A TCP packet with a maximum Ethernet packet size of 52 bytes and 1500 bytes is used for measurements. It should be appreciated that this server configuration is just one example of many server configurations that may be used to implement embodiments of the present invention.

An embodiment accelerated NetPath implementation removes buffer-copying overheads present in grant mechanisms. For example, Dom0 overhead during TO data transfer is 0 and the Dom0 CPU cache remains unpolluted with unused guest domain data. Because the NIC queue memory is directly mapped to the guest, VCPU scheduler accounting burden is reduced, thereby increasing fairness in the credit scheduler. Finally, moving TX/RX data transfer to the guest OS allows the guest OS driver to allocate buffer after RX operation, thereby giving better control data cache alignment during buffer copy. This also reduces DomU CPU cache pollution. Table 1 shows a performance comparison between existing Netchannel2, and embodiment Accelerated Netpath implementations. Here, it can be seen that with a Dom0 CPU load, the embodiment Accelerated NetPath implementation has a more linear TO latency response with increased number of guests compared to the Netchannel2 channel mode.

TABLE 1

TX/RX Performance Comparison

| Mode | # guests | Dom0 CPU | DomU CPU % | IO latency (packet/sec) |
|---|---|---|---|---|
| Dom0 | 0 | 35% | -NA- | 7741 |
| Netchannel2 (PV) | 1 | 42% | 18% | 5941 |
| Netchannel2 (PV) | 3 | 103% | 21% | 4978 |
| Accelerated NetPath | 1 | 2.4% | 70% | 5715 |
| Accelerated NetPath | 3 | 3.3% | 73% | 5812 |

Figure 4:
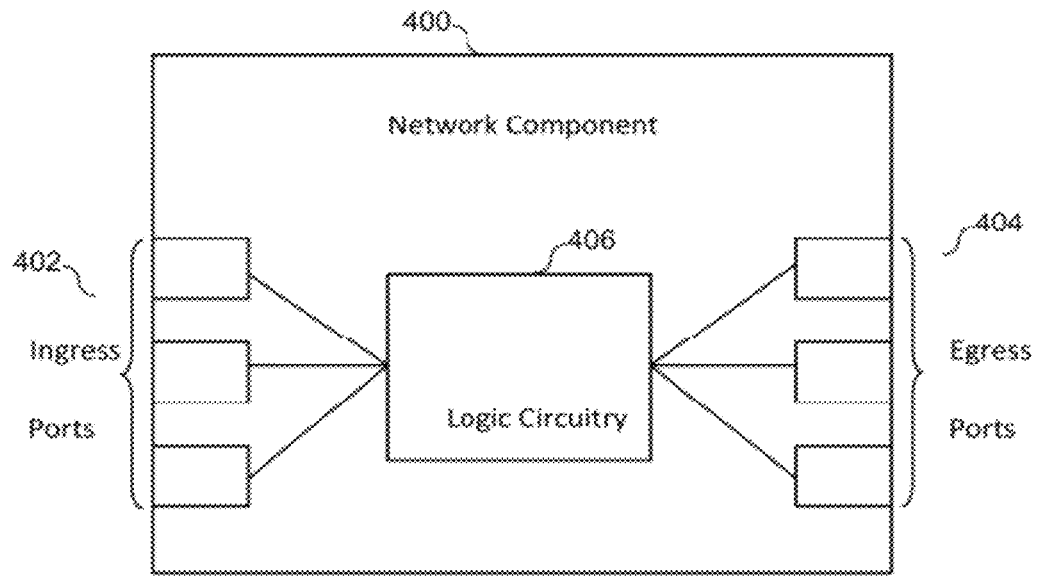
FIG. 4 illustrates an embodiment network apparatus.

At least some of the described embodiment features and methods may be implemented in a network apparatus or component, such as an Ethernet or Internet Protocol (IP) node. For instance, the features/methods in the disclosure may be implemented using hardware, firmware, and/or software installed to run on hardware. The network apparatus/component or node may be any device that transports frames through a network, e.g. Ethernet or IP network. For example, the network apparatus/component may include bridges, switches, routers, or various combinations of such devices. As shown in FIG. 4, network apparatus/component 400 may comprise a plurality of ingress ports 402 or units for receiving frames from other nodes, logic circuitry 406 to determine which nodes to send the frames to, and a plurality of egress ports 404 or units for transmitting frames to the other nodes.

Figure 5:
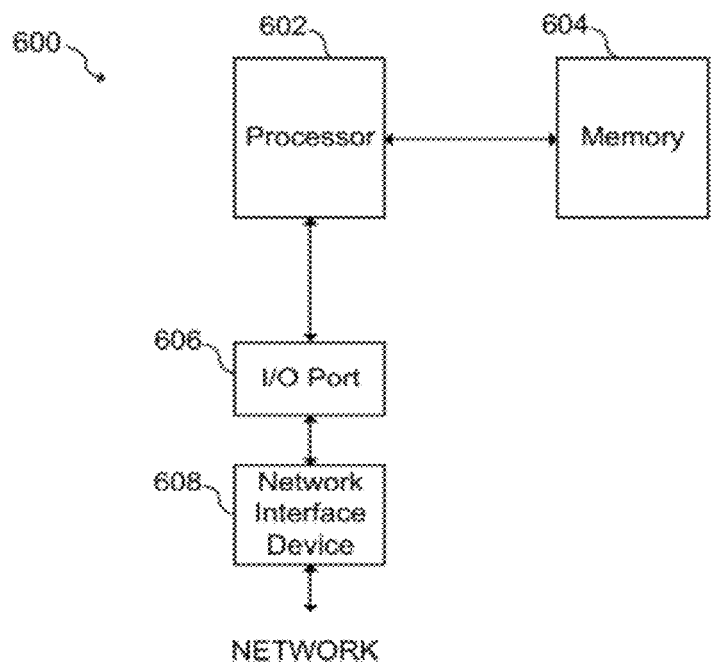
FIG. 5 illustrates an embodiment processing system.

FIG. 5 illustrates processing system 600 that can be utilized to implement methods of the present invention. In this case, the main processing is performed by processor 602, which can be a microprocessor, digital signal processor or any other appropriate processing device. In some embodiments processor 602 can be implemented by a plurality of processors. Program code (e.g., the code implementing the algorithms disclosed above) and data can be stored in memory 604. The memory can be local memory such as DRAM or mass storage such as a hard drive, optical drive or other storage (which may be local or remote). While the memory is illustrated functionally with a single block, it is understood that one or more hardware blocks can be used to implement this function.

In one embodiment, the processor can be used to implement some or all of the various units shown in FIG. 5. For example, the processor can serve as a specific functional unit at different times to implement the subtasks involved in performing the techniques of the present invention. Alternatively, different hardware blocks (e.g., the same as or different from the processor) can be used to perform different functions. In other embodiments, some subtasks are performed by the processor while others are performed using a separate circuitry.

FIG. 5 also illustrates I/O port 606, which is used as an interface to network interface device. Network interface device 608 can be implemented as a network interface card (NIC) as described and configured according to the embodiments described above, and provides an interface to a network.

In accordance with an embodiment a method of running a virtual machine on a server includes controlling data path resources allocated to the virtual machine using a first supervisory process running on the server, controlling data path resources comprising controlling a data path of a hardware interface device coupled to the server, and controlling control path and initialization resources of the hardware interface device using a second process running on the server, where the second process is separate from the first process. In an embodiment, the first supervisory process may be a hypervisor, and the second process may be a control plane. In some embodiments, controlling the data path of the hardware interface device includes controlling a data path of a network interface card (NIC).

In some embodiments, controlling the data path resources further includes the first supervisory process intercepting and emulating all memory mapped input/output (MMIO) performed by the virtual machine. Emulating may include translating buffer addresses of the virtual machine. In some embodiments, the first supervisory process monitors the data path resources for security violations.

In an embodiment, the method also includes transmitting and receiving packets between the virtual machine and the hardware interface via the first supervisory process. Transmitting a data packet may include initiating a system call within a guest user domain to send a data packet, context switching the data packet from the guest user domain to a guest kernel, context switching the data packet from the guest kernel to the first supervisory process, and transmitting the data packet from the first supervisory process to the hardware interface device. Moreover, receiving a data packet may include transferring the packet from the hardware interface device to the first supervisory process, context switching the data packet form the first supervisory process to a guest kernel, and context switching the data packet from the guest kernel to system call in a user domain.

In accordance with another embodiment, a method of operating a server system for running a plurality of virtual machines includes loading a control plane process, loading a supervisory process instantiating a virtual machine controlling data path resources between the virtual machine and a hardware interface device via the supervisory process, and controlling control path and initialization resources of the hardware interface device via the control plane process. In some embodiments, the supervisory process comprises a hypervisor. Controlling data path resources may include the supervisory process intercepting and emulating all memory mapped input/output (MMIO) performed by the virtual machine. In an embodiment, emulating comprises translating buffer addresses of the virtual machine. In an embodiment, controlling data path resources may include mapping data from a queue of the virtual machine to a queue of the hardware interface device.

In an embodiment, the method further includes transmitting and receiving packets between the virtual machine and the hardware interface via the supervisory process. Furthermore, in some embodiments, instantiating the virtual machine includes instantiating a plurality of virtual machines.

In accordance with a further embodiment, a data processing system for a virtual machine includes a processor, a memory coupled to the processor, and an interface port configured to be coupled to a hardware network interface device separate from the processor. The processor is configured to run a first process that transfers data between a packet queue associated with the virtual machine and a packet queue within the hardware network interface via the interface port. The process is further configured to run a second process that controls a configuration of the hardware network interface device, the second process being separate from the first process. In an embodiment, the processor may be configured to run the virtual machine.

In an embodiment, first process is a hypervisor, which may include a fast-path data driver coupled to a device emulates memory mapped input/output (MMIO) to the virtual machine. In some embodiments, the hardware network interface device is a network interface card (NIC). Some systems may also include the hardware network interface device itself.

In accordance with a further embodiment, a non-transitory computer readable medium has an executable program stored therein. The program instructs a processor to perform the steps of loading a control plane process, loading a supervisory process, instantiating a virtual machine, controlling data path resources between the virtual machine and a hardware interface device via the supervisory process, and controlling control path and initialization resources of the hardware interface device via the control plane process. The step of controlling data path resources further may include the supervisory process performing the steps of intercepting and emulating all memory mapped input/output (MMIO) performed by the virtual machine. Furthermore, the step of emulating may include translating buffer addresses of the virtual machine. In an embodiment, the supervisory process may be a hypervisor.

In some embodiments, the step of controlling data path resources includes the step of mapping data from a queue of the virtual machine to a queue of the hardware interface device. The program may further instruct the processor to further perform the steps of transmitting and receiving packets between the virtual machine and the hardware interface via the supervisory process.

Advantages of embodiments include a reduced number of context switches, reduced CPU cost by using direct IO page mapping achieved through leveraging multi-queue NICs, increased guest VM IO latency, which directly affects scalability compare to existing PV implementations, and the ability to port in both x86-64 and x86-32 bit modes. The added effect of reduced CPU load, also increases VM scalability and produces better power management.

A further advantage includes improved IO latency. For example, an embodiment IO mechanism may achieve, for example, about 68 percent IO latency improvement over other recent PV approaches such as Netchannel2, and about 100 percent latency improvement over traditional PV approaches.

Furthermore, embodiment implementations provide notable benefits over current PV implementations, such as NetChannel2, while retaining current PV advantages, such as guest address space isolation, discernable IO traps for more granular control over inter and intra VM TO, and prevention of buggy drivers causing system crashes. Further advantages include retention of VM IO scalability regardless of the number of VMs.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of running a virtual machine on a server, the method comprising:
   managing access to data path resources of a hardware interface device allocated to the virtual machine using a first hypervisor running on the server, wherein managing access to the data path resources comprises controlling a data path of a hardware interface device coupled to the server; and
   managing access to control path and initialization resources of the hardware interface device using a second hypervisor running on the server, the second hypervisor being separate from the first hypervisor, wherein the first hypervisor independently manages access to all of the data path resources of the hardware interface device allocated to the virtual machine through a first interrupt vector, wherein the second hypervisor independently manages access to all of the control path and initialization resources of the hardware interface device through a second interrupt vector that is different than the first interrupt vector, and wherein the second hypervisor comprises a quick emulated device model (QEMU) that is separate and distinct from the first hypervisor.

2. The method of claim 1, wherein controlling the data path of the hardware interface device comprises controlling a data path of a network interface card (NIC).

3. The method of claim 1, wherein managing access to the data path resources further comprises intercepting and emulating, by the first hypervisor, all memory mapped input/output (MMIO) performed by the virtual machine.

4. The method of claim 3, wherein emulating all the MMIO performed by the virtual machine comprises translating buffer addresses of the virtual machine.

5. The method of claim 1, further comprising transmitting and receiving packets between the virtual machine and the hardware interface via the first hypervisor.

6. The method of claim 1, further comprising transmitting a data packet by:
   initiating a system call within a guest user domain to send a data packet;
   context switching the data packet from the guest user domain to a guest kernel;
   context switching the data packet from the guest kernel to the first hypervisor; and
   transmitting the data packet from the first hypervisor to the hardware interface device.

7. The method of claim 1, further comprising receiving a data packet by:
   transferring the packet from the hardware interface device to the first hypervisor;
   context switching the data packet form the first hypervisor to a guest kernel; and
   context switching the data packet from the guest kernel to system call in a user domain.

8. A method of operating a server system for running a plurality of virtual machines, the method comprising:
   loading a first hypervisor;
   loading a second hypervisor;
   instantiating a virtual machine;
   managing access to data path resources between the virtual machine and a hardware interface device via the first hypervisor; and
   managing access to control path and initialization resources of the hardware interface device via the second hypervisor,
   wherein the first hypervisor independently manages access to all of the data path resources of the hardware interface device allocated to the virtual machine through a first interrupt vector, wherein the second hypervisor independently manages access to all of the control path and initialization resources of the hardware interface device through a second interrupt vector that is different than the first interrupt vector, and wherein the second hypervisor comprises a quick emulated device model (QEMU) that is separate and distinct from the first hypervisor.

9. The method of claim 8, wherein managing access to the data path resources further comprises intercepting and emulating, by the first hypervisor, all memory mapped input/output (MMIO) performed by the virtual machine.

10. The method of claim 9, wherein emulating all the MMIO performed by the virtual machine comprises translating buffer addresses of the virtual machine.

11. The method of claim 8, wherein managing access to the data path resources comprises mapping data from a queue of the virtual machine to a queue of the hardware interface device.

12. The method of claim 8, further comprising transmitting and receiving packets between the virtual machine and the hardware interface via the first hypervisor.

13. The method of claim 8, wherein instantiating the virtual machine comprises instantiating a plurality of virtual machines.

14. A data processing system for a virtual machine, the data processing system comprising:
    a processor;
    a memory coupled to the processor; and
    an interface port configured to be coupled to a hardware network interface device separate from the processor, wherein the memory stores programming for execution by the processor, the programming including instructions to:
        run a first hypervisor that transfers data between a packet queue associated with the virtual machine and a packet queue within the hardware network interface via the interface port; and
        run a second hypervisor that controls a configuration of the hardware network interface device, the second hypervisor being separate from the first hypervisor,
    wherein the first hypervisor independently manages access to all data path resources of the hardware interface device allocated to the virtual machine through a first interrupt vector, wherein the second hypervisor independently manages access to all control path and initialization resources of the hardware interface device through a second interrupt vector that is different than the first interrupt vector, and wherein the second hypervisor comprises a quick emulated device model (QEMU) that is separate and distinct from the first hypervisor.

15. The data processing system of claim 14, wherein the programming further includes instructions to run the virtual machine.

16. The data processing system of claim 14, wherein the hypervisor comprises a fast-path data driver coupled to a device that emulates memory mapped input/output (MMIO) to the virtual machine.

17. The data processing system of claim 14, wherein the hardware network interface device is a network interface card (NIC).

* * * * *